Sept. 18, 1962  J. R. HANDLEY ETAL  3,054,251
PARKING METER AND TIME RELEASE STRUCTURE THEREFOR
Filed Oct. 27, 1958  4 Sheets-Sheet 1
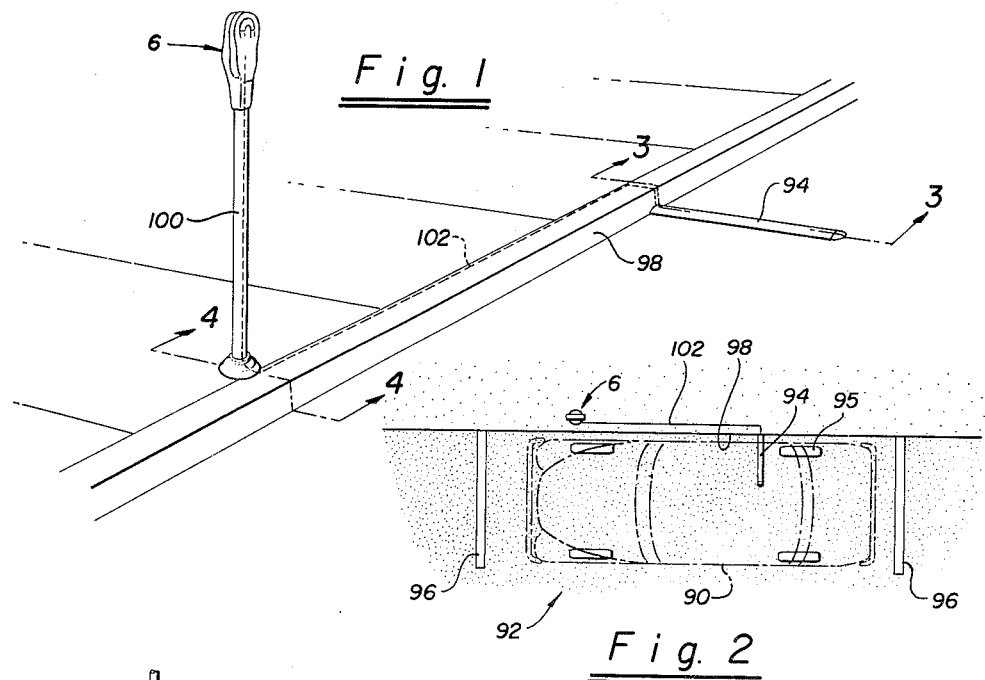
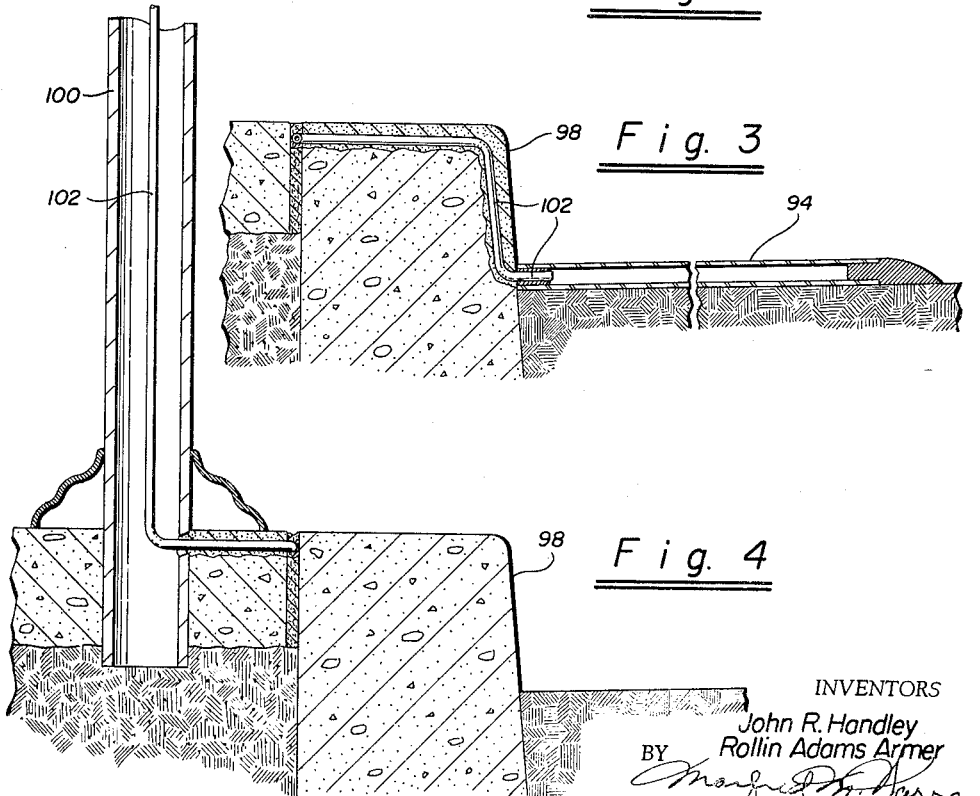
INVENTORS
John R. Handley
Rollin Adams Armer
BY
Their Attorney Sept. 18, 1962   J. R. HANDLEY ETAL   3,054,251
PARKING METER AND TIME RELEASE STRUCTURE THEREFOR
Filed Oct. 27, 1958                     4 Sheets-Sheet 2

INVENTORS
John R. Handley
Rollin Adams Armer
BY
Their Attorney

INVENTORS
John R. Handley
Rollin Adams Armer
BY
Their Attorney

Sept. 18, 1962   J. R. HANDLEY ETAL   3,054,251
PARKING METER AND TIME RELEASE STRUCTURE THEREFOR
Filed Oct. 27, 1958   4 Sheets-Sheet 4

INVENTORS
John R. Handley
Rollin Adams Armer
BY
Their Attorney

United States Patent Office 3,054,251
Patented Sept. 18, 1962

3,054,251
PARKING METER AND TIME RELEASE
STRUCTURE THEREFOR
John R. Handley, Los Altos, and Rollin Adams Armer, Berkeley, Calif., assignors, by mesne assignments, to Calpat Products, Inc., a corporation of Nevada
Filed Oct. 27, 1958, Ser. No. 769,889
3 Claims. (Cl. 58—142)

The invention relates to coin operated parking meters for limiting the parking time of an automotive vehicle to the time bought on the meter, and has special reference to devices for returning the meter to its "zero" indication to wipe out any remaining bought time as the vehicle leaves the parking space for which the meter is provided.

The present invention has as its principal object, the provision of a parking meter and time release structure therefor which is simple in construction, foolproof in operation, rugged in use, dependable in service, and utilizes a low cost mechanism.

It is a further object of this invention to provide a time release structure of the type described which is designed to fail in operating position of the meter whereby if the vehicle leaving the parking area does not actuate the time release, for any reason, the meter will continue to function in normal manner.

Other objects and advantages will become apparent from the following detailed description of construction and operation, taken in conjunction with the accompanying drawings forming a part thereof, wherein like numerals refer to like parts, and in which:

FIGURE 1 is a fragmentary perspective view of a street and curbing therefor in which a parking meter embodying this invention has been installed.

FIGURE 2 is a plan view of FIGURE 1, on a smaller scale, showing an automobile in dot-dash lines parked in the space on the street controlled by the meter.

FIGURE 3 is an enlarged cross-section taken along line 3—3 of FIGURE 1.

FIGURE 4 is an enlarged cross-section taken substantially along line 4—4 of FIGURE 1 and in which the meter and upper portion of the supporting standard has been omitted.

Figure 6:
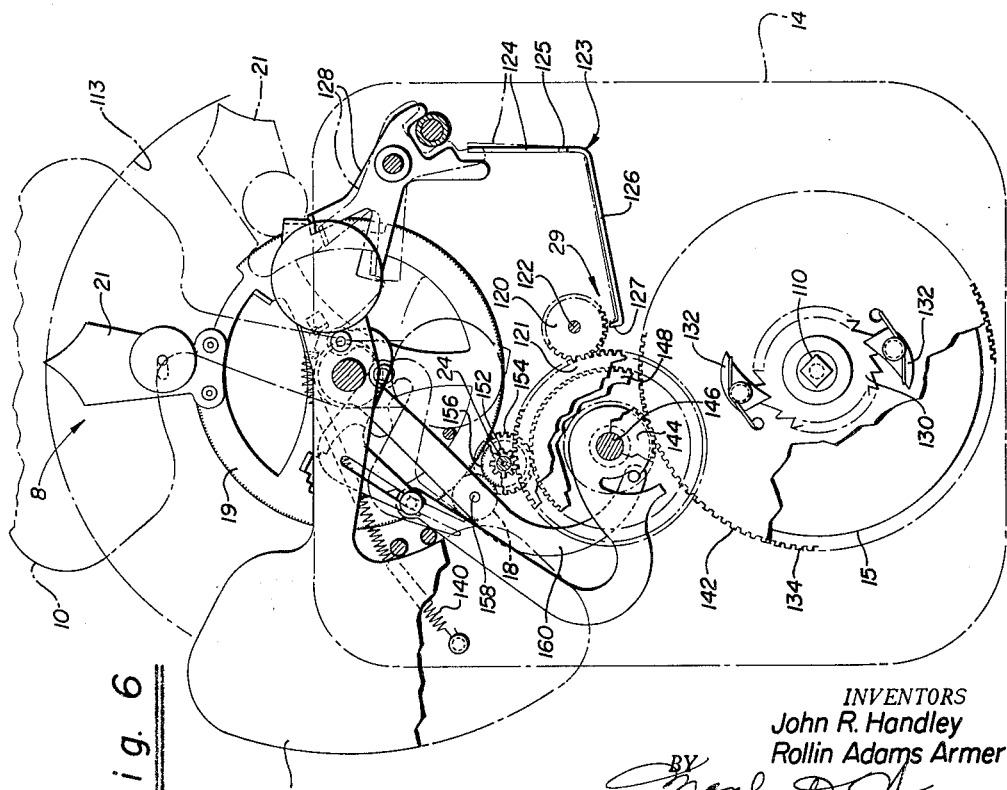
FIGURE 6 is a front elevation of the clock mechanism shown in FIGURE 5 with the front plate of the mechanism removed so as to show the internal parts, the outline of the removed plate being shown in phantom.
Figure 8:
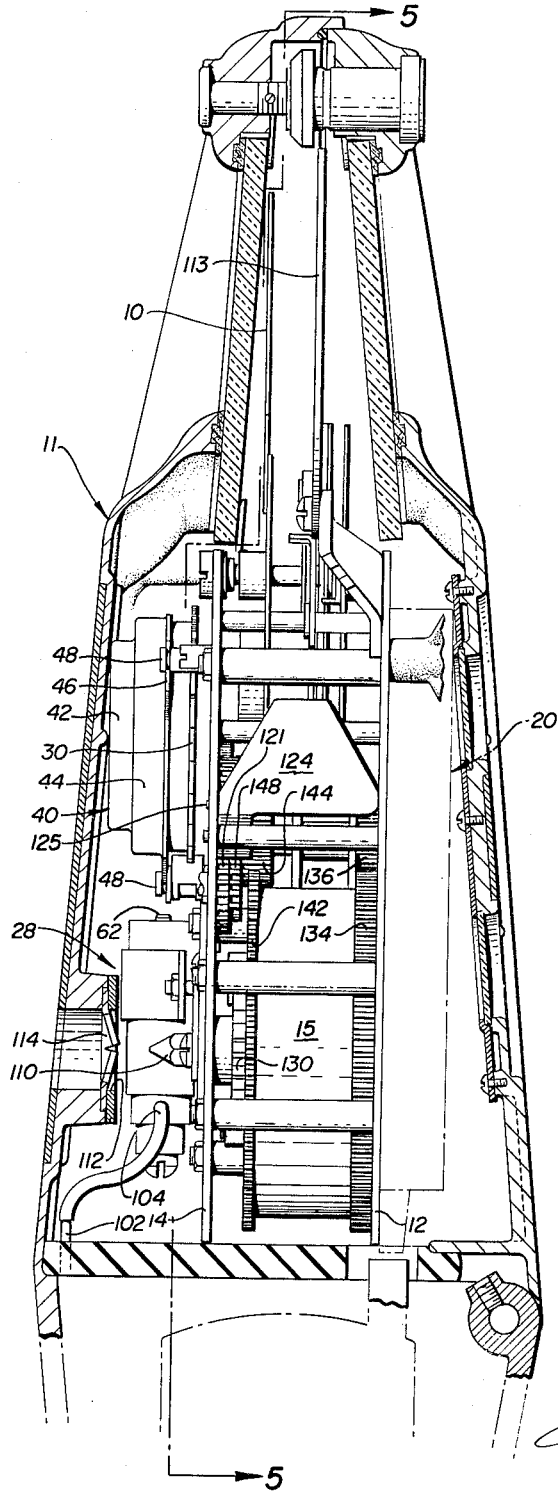
FIGURE 8 is a vertical cross-section through the meter housing with the meter mechanism shown in elevation, as suggested by line 8—8 in FIGURE 5.

Broadly considered the parking meter 6 and time release structure therefor contemplates an indicator including a pointer assembly 8 which is movable from a zero to an operative position and includes a violation flag 10 movable to operable and inoperable positions, as shown in the broken and solid line positions respectively in FIGURE 6, mounted on a support including a two piece meter housing 11. A clock mechanism, also contained in the meter housing and having a frame including spaced parallel front and rear cover plates 12 and 14 carried by housing 11, includes a drive train having an escapement 16 and a driven member in the form of a gear 18 in a terminal position to effect movement of the pointer assembly 8 causing movement of flag 10 from its inoperative to the operative position. Coin controlled means 20 will upon actuation, move flag 10 to its inoperable position and effect operation of escapement 16 over a given period of time. Escapement 16 has an operative connection between the frame (plates 12, 14) and the drive train and imposing a brake on the train, causing a relatively slow, timed movement of the driven member to its terminal position. A drive selector mechanism 22 is removably mounted on the rear plate 14 and operatively connected through a short square shaft 24 to the clock mechanism through the drive train thereof. Drive selector mechanism 22 has a first position in which the torque applied upon the drive train passes through escapement 16 for timed displacement of driven member 18 and a second position causing the applied torque to by-pass escapement 16 to induce driven member 18 to move flag 10 instantaneously to its operable position. Holding means 26 mounted on rear plate 14 normally maintains selector mechanism 22 in its first position, and constitutes a means connected to selectively break the frame-drive-train connection for rapid movement of the driven member (gear 18) to its terminal position. An air cylinder assembly 28 carried on rear plate 14 defines means functioning when energized to release holding means 26 from its normal engagement with drive selector mechanism 22 and cause the latter to displace to its second position moving flag 10 to its operable position.

Driven member, gear 18, meshes with gear 19 of the pointer assembly so that the driven member of the drive train moves the pointer 21 fixed on the pointer gear 19 from an active time indicating position to which it has been moved by the wire controlled means 20 to an inactive zero position through the action of the drive train of the clock mechanism. The clock mechanism also includes a heavy coil spring disposed within a circular casing 15 to define therewith a spring motor windable to store energy and is connected to the drive train to provide a torque thereon driving the driven member 18 either directly or through escapement 16, depending upon the action of selector mechanism 22.

Brake means 29 is operable by pointer assembly 8 in moving pointer 21 from active to inactive positions to move into engagement with the clock mechanism drive train to lock the drive train and prevent driven member 18 from effecting movement of the pointer to inactive position and flag 10 to operable position. Actuation of coin controlled means 20 actually meters a portion of the stored energy in the spring motor of the clock mechanism to move the pointer 21 to active position and flag 10 to inoperable position by driving the pointer assembly 8. The resulting movement of the pointer assembly will cause the release of brake means 29 from its locking engagement with the drive train. Driven member 18 can then be effective for inducing said movement of pointer assembly 8. Upon completion of said movement, brake means 29 will again be moved into its locking engagement with the drive train to once more render the torque on the drive train incapable of effecting operation of escapement 16.

The drive selector mechanism 22 comprises a case 32 with a ratchet wheel or plate 30 fixed as a bottom wall thereto, the case being a circular disc cover secured on the ratchet plate so that the teeth of the ratchet wheel project circumferentially around the case. Escapement 16 is housed within the case and is driven by shaft 24 on which case 32 is also centrally mounted for rotation upon release of holding means 26.

A centrifugal governor assembly 34 is connected to the drive selector mechanism 22 for regulating the speed at which the mechanism displaces from its first to its second position upon release of holding means 26.

Figure 5:
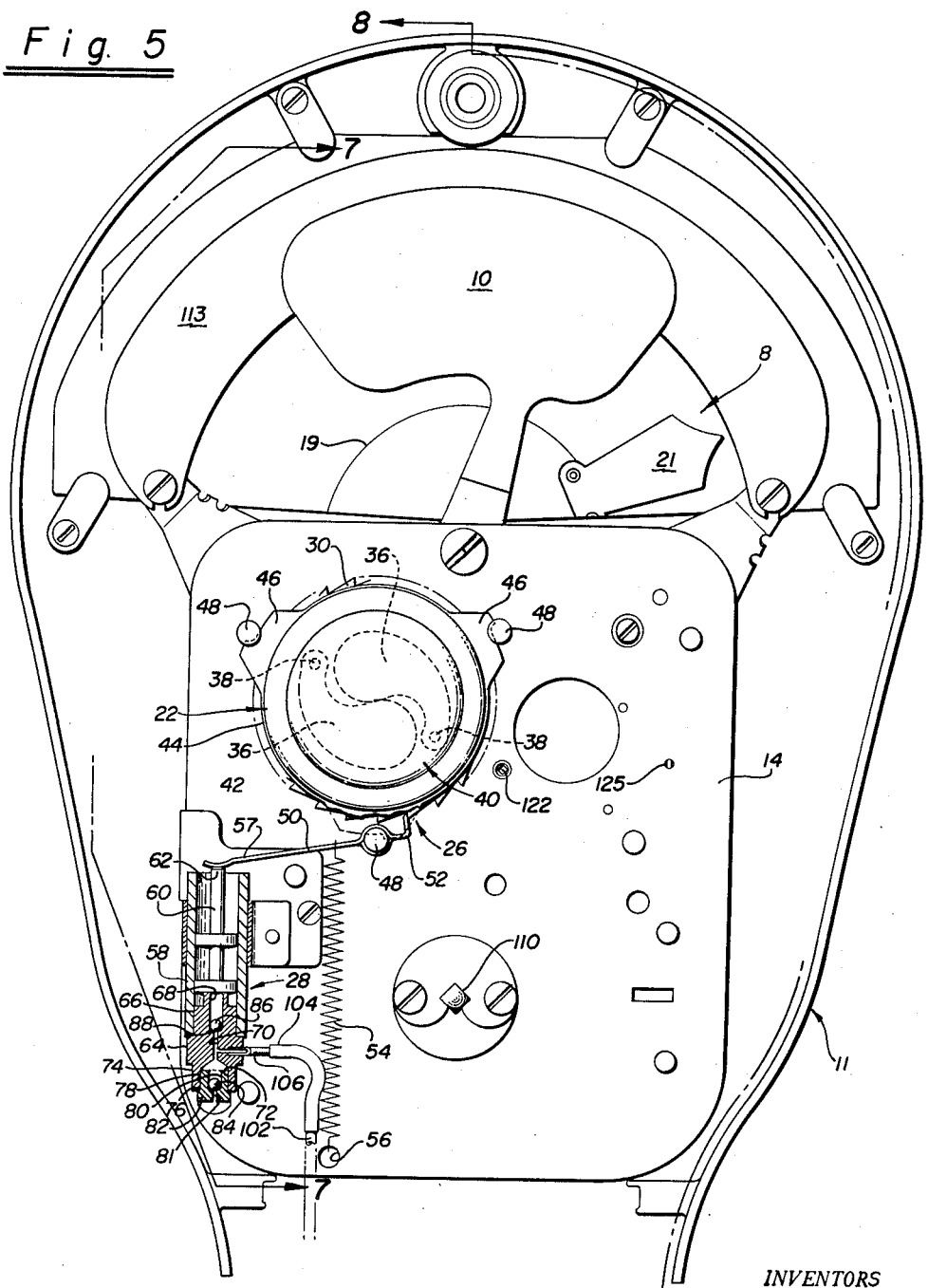
FIGURE 5 is a vertical cross-sectional view taken substantially on plane of line 5—5 of FIGURE 8.
Figure 7:
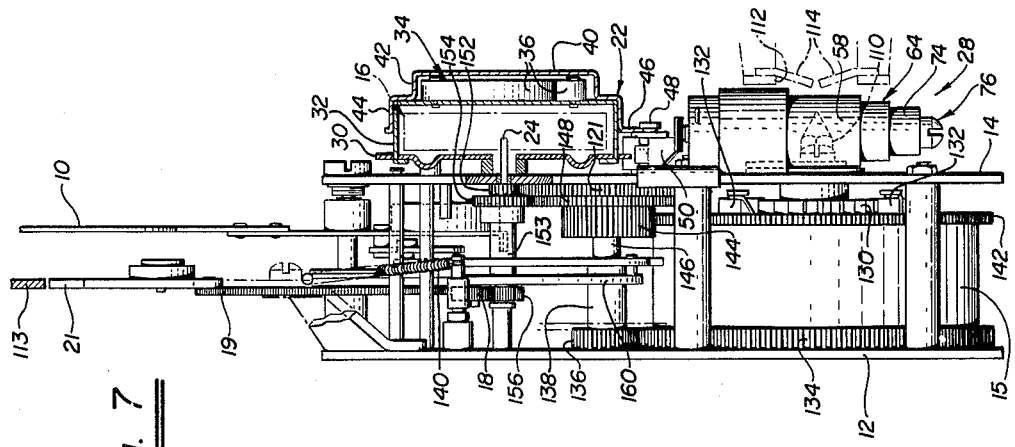
FIGURE 7 is a side elevation of the clock mechanism taken substantially from the position suggested by line 7—7 of FIGURE 5.

The governor assembly 34 has a pair of substantially identical arcuately formed, tear-drop shaped weights 36 with their narrow ends having holes centrally transversely therethrough to receive pins 38 upstandingly carried in diametrically opposed relation on the outer surface of the cover 32, as shown in FIGURE 5, for movement about the pins upon rotational displacement of the drive selector mechanism. A dished, circular retaining cover 40 encloses the weights 36 so that its side wall 42 defines a drum for limiting the outward movement of the weights about their pivot pins 38. Cover 40 also has an enlarged peripheral skirt portion 44 snugly engaging about the side wall of selector mechanism cover 32 and is provided with a plurality of circumferentially spaced, laterally extending locking ears 46 adapted to snap into retaining engagement within grooves provided adjacent the top of circumferentially spaced upstanding posts 48 carried by the rear plate 14, thus serving to hold the drive selector mechanism in place on the shaft 24, as well as containing the weights 36 of the governor.

As best seen in FIGURE 5, the holding means 26 releasably retaining drive selector mechanism in its first position is a lever 50 pivoted adjacent one end 52 upon the lowermost one of the post 48 for rocking movement about the post. The one end 52 has a terminal portion which defines a pawl urged into engagement with a tooth of ratchet wheel 36 by the tension of coil spring 54 connected at one end to lever 50 at the side of post 48 remote from the pawl end 52 thereof and the other end of the spring may be secured to the rear plate 14 as by being hooked into a hole 56 provided in the plate. The longer arm 57 of lever 50 has its terminal portion urged by spring 54 into abutting relation with the top of cylinder assembly 28.

Pneumatically operable cylinder 28, defining the means for releasing holding means 26 from its normal engagement with drive selector mechanism 22, includes an upstanding cylinder body 58 having a piston 60 mounted therein for movement longitudinally thereof through one end 62 to contact the free end of arm 57 of lever 50. Upon energization of the cylinder assembly, piston 60 will engage arm 57 causing lever 50 to rock about its pivot 48 and disengage pawl 52 from ratchet wheel 30. A pneumatic dash pot is provided in the cylinder assembly for holding the end 52 of piston in its lever engaging position, after the assembly has been actuated, for a time interval sufficient to permit the drive selector mechanism to complete its rotational displacement from its first to its second position. The pneumatic dash pot comprises a cylindrical body member 64 having one end portion 66 fitted into the end of the cylinder body remote from the end through which piston 60 moves. A longitudinal passage 68 in end portion 66 opens through the end of the body portion within cylinder body 58 and communicates at its other end with a central restricted passage 70 opening into an enlarged, internally threaded bore 72 opening through the other end portion 74 of the body member 64. A valve plug 76 having an externally threaded shank 78 is provided with a central well 80 opening through one end thereof. An enlarged driving head 82 is carried by the other end of shank 78. The plug shank 78 is driven by a suitable tool into threaded engagement with the internal threading of end portion 74 of the valve plug. A valve ball 84 is disposed within well 80 and is of a size adapted to seat under pneumatic pressure in the tapered end of well 80 which defines a valve seat where the well joins restricted passage 81 communicating with atmosphere through the driving slot in head 82. Another valve ball is disposed in passage 68 and adapted to close communication between passages 68 and 70 when seated in the tapered neck 88 connecting passages 68 and 70 and which tapered neck defines a valve seat for valve ball 86.

Thus, as an automotive vehicle, such as automobile 90 shown in phantom in FIGURE 2, leaves its parking area 92 it will pass over hollow resilient hose 94 disposed in the parking area adjacent the rear wheels of the parallel parked vehicle. As auto 92 pulls out of parking area 92, defined between parallel markings 96 on the street extending perpendicular to curb 98 and controlled by the meter 6, mounted atop a hollow standard 100 secured in the sidewalk adjacent curb 98, the automobile will have one of its rear wheels, its curb wheel 95, pass over the hose 94 causing the tube to deform and displace air therewithin. Deformation of hose 94 creates an air pulse which enters through one end of a pipe 102 disposed in the grout of the curb 98, as shown in FIGURE 3, and extends upwardly through the interior of standard 100. The air pulse travels through pipe 102 and is discharged from the other end 104 into a tubular extension 106 carried by valve plug 64. The tubular extension has its free end inserted into the end 104 of the base to form an air-tight connection therebetween and the extension also provides a passage communicating with passage 70. The air pulse, therefore, passes through extension 106 into passage 70, tends to flow in both directions in passage 70. But since bore 72 will be closed by valve ball 84, the pulse must seek its return to atmosphere through passage 68. Thus ball 86 will be lifted from its seat 88, and the air pulse will impinge against the bottom of piston 60 causing the piston to move through the one end of cylinder remote from the end closed by valve plug 64. Once the air pulse has passed through valve seat 88, the back pressure produced by the return of the deformed hose to its original form will cause ball 86 to again seat closing passage 68 and at the same time draw ball 84 from its seat at the bottom of well 80 so that the demand for air created by reformation of air hose 94 is provided by the flow of atmospheric air through passage 80. The increased air pressure within passage 68 and the cylinder body 58 behind piston 60 will gradually leak past the piston to escape to atmosphere so that as the increased pressure is thus dissipated, the piston will gradually settle gravitally to its inactive position. However, the dash pot action described will maintain the piston in its active, raised position to keep pawl 52 out of engagement with the teeth of ratchet wheel 30 for a sufficient time interval to permit time selector mechanism to fully complete its displacement from its first to its second position.

With respect to the disposition of hose 94 in the parking area 92, it will be noted that the hose is perpendicular to the curb 98 and is normally arranged to be between the front and rear wheels of a properly parked car, but is closely adjacent the rear wheels. Since, the ordinances of most municipalities using parking meters require the vehicle to be parallel parked with its wheels close to the curb, the hose length can be kept quite short, say two feet or less. Also, because of the disposition of the hose 94, it is virtually impossible for a properly parked vehicle to leave the parking area without the rear wheel thereof adjacent the curb passing over the hose to initiate action of the time release structure built into the meter.

Basically, meter 6 is the automatically coin operated type manufactured by Magee-Hale Park-O-Meter Co. of Oklahoma City, Oklahoma, and is sold commercially under the trade name "Park-O-Meter," modified to provide the structure above described. Meter 6 is placed in operating condition by turning the squared end 110 of a winding stem connected to the spring of the motor. Entry of a key to effect the wind up of the spring is afforded by an opening 112 in the meter housing through flaps 114 bridging opening 112. The energy stored in the wound spring motor is metered by a coin-operated mechanism when a coin is inserted to move the pointer assembly so that the pointer indicates the amount of time bought on index scale 113, and the violation flag is moved to its inoperable position. Movement of the pointer assembly effects the release of brake means 29 to allow the torque placed upon the clock mechanism train to pass into the escapement for effecting a timed return of the pointer assembly to its initial position and the violation flag to its operable position. Brake means 29 comprises a brake gear 120 fixed on an idler shaft 122 and in mesh with intermediate gear 121 of the clock mechanism drive. An L-shaped brake lever 123 having an upstanding broad plate 124 forming one leg of the lever is pivoted as at 125 (FIGURE 6) adjacent its junction with the other narrow laterally projecting leg 126 of the lever. The terminal end of leg 126 has an upturned foot 127 which is adapted to be moved into locking engagement between the teeth of gear 120 as the lever is pivoted from the solid to the broken line position shown in FIGURE 6 by actuating lever 128, pivoting from the solid to broken line positions thereof caused by the return of the pointer assembly gear 19 to its original or zero position, to engage broad plate 124. When brake lever 123 is thus forced into locking engagement with brake gear 120, transmission of the torque of the spring motor to the escapement 22 cannot be effective because the drive train is locked. Upon release of the brake means 29 by the operation of the coin controlled means 20, the drive train is unlocked and is effective to transmit the torque of the spring motor to the escapement which, in turn, effects timed movement of the indicator assembly to its original position and the movement of the flag 10 to its operable position upon the expiration of the time period bought by the coin inserted into the meter.

Since the brake means 29 is released when the coin controlled mechanism is operated, the stored energy would act to immediately return the pointer assembly to its original position without passing through the timed movement effected by the escapement unless another brake or holding means is provided. Holding means 26 serves this purpose. So long as the pawl end 52 of the holding lever 52 is in engagement with a tooth of ratchet 30, the torque of the spring motor drives the escapement 16. However, when the pawl 52 is removed from its engagement with ratchet 30, the torque of the spring motor is transmitted through shaft 24 and drives the shaft 24 to cause rotational displacement of the drive selector mechanism so that the timed action of the escapement on the drive train is by-passed and the drive train is free to run until the pointer mechanism again causes actuating lever 128 to move brake lever 123 into its locking engagement with brake gear 120 to once again lock the drive train and preventing the torque of the spring motor train from reaching the escapement 16 so as to render the escapement inoperative until the next time the coin controlled mechanism is actuated.

In the event of failure of the pneumatic tube or should weather conditions, such as snow or ice, or street debris render the tube 94 ineffective to produce the air pulse required to actuate the time release structure, the escapement 16 will continue to function so that the meter will allow the full amount of time bought to elapse before violation flag 10 will be moved to its operable position. Of course, under those conditions the departure of a vehicle from the parking area will not actuate the time release structure incorporated into the meter, but the meter will continue to operate as if the time release structure were not present until the conditions preventing actuation of the time release structure is alleviated. Thus, while no additional revenue will be gained during the inoperative periods of the time release structure, the revenue realized from the normal operation of the meter will continue to accrue.

With further reference to the holding lever 50, it is shown as being pivoted on the lowermost ones of the cover retaining posts 48. This has been done to fully utilize all available parts to simplify construction and reduce cost of production. However, it is possible that the pivot for lever 50 may be provided by a separate post or pin located differently than lowermost post 48 if found desirable for increased efficiency of the operation of holding means 26. In any event, the lever 50 will be pivoted adjacent the pawl end 52 so that the longer arm 57 will be engaged by piston 60 whereby the greater moment of force of the lever about its pivot will be at this side. Hence, the force required of piston 60 to rock the lever about its pivot can be quite small since the ratio of movements between the two arms of the lever will be in the range of four or five to one.

After the meter has been placed in operating condition by winding stem 110 against the action of ratchet 130 and the spring-urged pawls 132 associated therewith, a coin deposited in coin controlled mechanism 20 releases the spring motor to drive a main gear 134 which in turn drives a smaller gear 136 mounted on shaft 138 for rotation thereabout to release the pointer mechanism to move under the influence of spring 140, to its active position which will move flag 10 to its inoperable position, and releasing the brake means 29 from the drive train.

The drive train is now operative to function under the torque of the spring motor. The drive train includes a main gear 142 driven directly from the spring motor. Gear 142 meshes with and drives gear 144 pinned on shaft 146 coaxial with shaft 138. Also fixed to shaft 146 are gears 148 and 121. Gear 121 drives escapement 16 through gear 152 pinned on shaft 153 and shaft 24. Thus, gear 121 is that element of the train engaged by the brake gear 120. Gear 148 drives gear 154 fixed on shaft 153. Also fixed on shaft 153 is gear 156 meshing with driven member 18, in its terminal position, to drive pointer gear 19 in a direction returning the pointer 21 to its inactive or zero position. Driven member 18 is mounted for free rotation on a stub shaft 158 carried intermediate the ends of a lever 160 which is pivoted to move the gear 18 out of mesh with gear 156 when the pointer mechanism moves in response to actuation of the coin controlled mechanism and back into mesh when the pointer mechanism movement has been completed.

We claim:

1. In a parking meter and time cancellation mechanism therefor, a support, a clock mechanism having a main spring carried by said support, a revolvable mount carried by said support, an escapement carried by said mount and having a coaxially mounted drive shaft connected to said spring, releasable means holding said mount non-rotational during normal run down operation of said clock mechanism, a pneumatic actuator connected to said releasable means and being adapted for connection to a pneumatic sensing means in an associated vehicle parking space and having a forward stroke responsive to an air pulse from said sensing means to release said mount for rotation to effect rapid cancellation of purchased time remaining on said meter, means stopping rotation of said shaft upon cancellation of said time, said shaft providing the sole rotating drive connection between said main spring and said escapement and mount whereby the dynamic load of said rotating mount is imposed as a strain on said shaft upon stopping of said shaft by said last named means, a weight carried by said mount for centrifugal displacement into braking engagement with said support for limiting the rotational speed of said mount and said strain on said shaft, said pneumatic actuator having a return stroke displacing said releasable means to hold said mount, and pneumatic means connected to said actuator and delaying said return stroke for the period of said rapid time cancellation.

2. In a parking meter and time cancellation mechanism therefor, a support, a clock mechanism having a main spring carried by said support, a mounting cap secured to said support and a rotating mount carried thereby, releasable means connecting said support and mount and having an engaged position holding said mount stationary and a disengaged position releasing said mount for rotation, an escapment carried by said mount and having a coaxially mounted drive shaft connected to said spring for imposing a restrained timing movement thereon when said mount is held stationary and driving said mount when released to effect rapid cancellation of purchased time remaining on said meter, means stopping rotation of said shaft upon cancellation of said time, said shaft providing the sole rotating drive connection between said main spring and said escapement and mount whereby the dynamic load of said rotating mount is imposed as a strain on said shaft upon stopping said shaft by said last named means, a weight carried by said mount for centrifugal radial displacement, said mounting cap having a cylindrical side wall portion in the radial plane of said weight for engagement therewith for limiting the rotational speed of said casing and the strain on said shaft, a pneumatic actuator connected to said releasable means and being adapted for connection to a pneumatic sensing means in an associated vehicle parking space and having a forward stroke responsive to an air pulse from said sensing means to displace said releasable means to disengaged position and having a return stroke displacing said releasable means to engaged position, and pneumatic means connected to said actuator and delaying said return stroke for the period of said rapid time cancellation.

3. In a parking meter and time cancellation mechanism therefor, a support, a clock mechanism having a main spring carried by said support, a casing having a cylindrical side wall and a perpendicularly related end wall, a mounting cap for said casing secured to said support and having a first cylindrical side wall portion engaging and journalling for rotation said casing side wall, pawl and ratchet means connecting said support and casing and having an engaged position holding said casing against rotation and a disengaged position releasing said casing for rotation, an escapement mounted in said casing and having a coaxially mounted drive shaft connected to said spring for imposing a restrained timing movement thereon when said casing is held stationary and driving said casing when released to permit relatively unrestrained rapid unwinding of said spring to effect rapid cancellation of purchased time remaining on said meter, means stopping rotation of said shaft upon cancellation of said time, said shaft providing the sole rotating drive connection between said main spring and said escapement and casing whereby the dynamic load of said rotating casing is imposed as a strain on said shaft upon stopping said shaft by said last-named means, a weight mounted on the exterior side of said casing end wall for centrifugal displacement, said mounting cap having a second cylindrical side wall portion in the radial plane of said weight for engagement therewith for limiting the rotational speed of said casing and the strain on said shaft, a pneumatic actuator connected to said pawl and ratchet means and being adapted for connection to a pneumatic sensing means in an associated vehicle parking space and having a forward stroke responsive to an air pulse from said sensing means upon removal of a vehicle from said space to displace said pawl and ratchet means to disengaged position and having a return stroke displacing said pawl and ratchet means to engaged position, and pneumatic means connected to said actuator and delaying said return movement for the period of said rapid time cancellation.

References Cited in the file of this patent
UNITED STATES PATENTS

| | | |
|---|---|---|
| 2,020,739 | Porter | Nov. 12, 1935 |
| 2,096,155 | Breeden | Oct. 19, 1937 |
| 2,340,442 | Toce et al. | Feb. 1, 1944 |
| 2,519,634 | Burton | Aug. 22, 1950 |
| 2,546,433 | Dick | Mar. 27, 1951 |
| 2,593,191 | Rockola | Apr. 15, 1952 |
| 2,983,097 | Ewing | May 9, 1961 |